United States Patent Office 3,038,808
Patented June 12, 1962

3,038,808
METHOD OF MAKING ANGEL FOOD CAKE AND PREMIX THEREFOR
Joseph R. Perrozzi and Emery C. Swanson, Minneapolis, Howard L. Walker, Hopkins, and Francis M. Y. Cheng, Minneapolis, Minn., assignors to The Pillsbury Company, Minneapolis, Minn., a corporation of Delaware
No Drawing. Filed Apr. 3, 1961, Ser. No. 100,011
16 Claims. (Cl. 99—92)

This invention relates to angel food cakes and is particularly concerned with a new product and method for the production of such cakes.

This application is a continuation-in-part of copending United States patent application, Serial No. 772,173, filed November 6, 1958 (now abandoned), and which was assigned to the same assignee.

In accordance with long standing procedures and beliefs, angel food cakes are conventionally prepared by whipping a quantity of egg whites into a stiff foam (the end point of whipping being reached when withdrawal of the whipping instrument will draw some of the foam into an upstanding stiff peak) folding a quantity of flour, sugar and perhaps some minor ingredients into the foam, taking care not to break down the foam, and then baking the mass. However, the sensitivity of this system, particularly with respect to formation and retention of the stiff foam, results in too frequent failures and poor quality cakes which are near-failures.

It is, of course, true that when the producer of angel food cakes employs premixes, wherein the selection and formulation of ingredients can be carefully controlled, cake quality is generally improved and the frequency of such failures is greatly reduced. Indeed, some of the prior art premixes are even provided with various believed-to-be foam stabilizing additives such as edible soaps and emulsifiers. Even so, the rate of failure and poor quality, from the producer's point of view, particularly the commercial producer, is still altogether too frequent.

Accordingly, it is an object of this invention to provide a composition for the production of angel food cakes of improved quality and a method for producing angel food cakes from such composition wherein there is achieved significant reduction of the frequency of failures and/or near-failures.

There are other objects and advantages of this invention, some of which will appear from the following description of the invention made in conjunction with several examples of specific embodiments thereof. It is to be understood, however, that recitation of these several illustrative examples is given for the sole purpose of facilitating an understanding of the invention by those skilled in the art to which the invention relates. Thus, the examples may not be construed as limiting the scope of the invention itself, which will admit of many other embodiments.

In general: The composition of this invention comprises an admixture of about one part cake flour, about three parts sugar and about three parts liquid egg whites, or the dehydrated solids thereof (in which case water of hydration must be supplied in order to attain the liquid phase), in combination with from about two to about eight percent of a chemical leavening composition. The method of this invention then generally comprises the steps of, admixing said flour, sugar, egg whites (and water of hydration if dried egg whites are used) and leavening composition, agitating said admixtures to blend the same, terminating the agitation prior to development of an observable foaming of the egg whites, and then baking said agitated admixture.

Otherwise stated, a composition embodying this invention will comprise about:

3–4 parts by weight of cake flour
10 parts by weight of sugar
1–2 parts by weight of chemical leavening
1–2 parts by weight of dehydrated egg whites (i.e., egg white solids).

One embodiment of the invention may take the form of a "complete" premix wherein, as above indicated, dehydrated egg white solids are admixed with flour, sugar and leavening, all in angel-food-cake proportions. When such a premix is combined with sufficient water to reconstitute the egg white solids, agitated in accordance with the method of this invention, and baked; angel food cake may be produced which, relative to prior art angel food cakes, is of significantly improved quality.

To illustrate:

Example I

A series of angel food cakes, of standard height and volume, was produced from a premix comprising 22.45% cake flour, 9.04% dehydrated egg white solids, 61.25% sugar, 0.3% salt, 2.0% sodium bicarbonate and 5.0% cream of tartar. In preparing each cake, one and one-fourth cups of water were added to 16 ounces of the premix and it was then blended with a household mixer, first at low speed for 30 seconds, then at half speed for two and one-half minutes. When the mixing was completed, there being no observable foaming of the egg white ingredient, the admixture was placed in a standard angel food cake pan and baked at 350° F. for 45 minutes. No failures or near-failures were had and the resultant cakes were of significantly excellent quality, notwithstanding the facts that; the egg whites had not been whipped into a stiff foam, about 10% less than the conventional quantity of ingredients was employed and the "batter" volume prior to baking was substantially less than that required to obtain standard volume and height with prior art compositions and methods.

Example II

Another series of angel food cakes was prepared from a premix comprising 22.4% flour, 9% dehydrated egg whites, 63.75% sugar, 0.3% salt, 0.45% anhydrous citric acid, 0.5% cream of tartar, 2.05% glucono delta lactone and 1.5% sodium bicarbonate. The "batter" preparation and baking procedure used to prepare cakes from this premix were the same as those described in Example I. The baked cakes were again significantly improved and no failures were encountered.

Example III

Another series of angel food cakes was prepared from a premix comprising 13.20% flour, 9.00% starch, 10.00% dehydrated egg whites, 63.00% sugar, 0.30% salt, 0.45% anhydrous citric acid, .50% cream of tartar, 2.05% glucono delta lactone and 1.50% sodium bicarbonate. The "batter" preparation and baking procedure used to prepare cakes from this premix were the same as those described in Example I and the baked cakes were again totally successful and significantly improved.

Another embodiment of the invention may take the form of an "incomplete" premix wherein, as above indicated, flour, sugar and leavening are provided, admixed in angel-food-cake proportions. When this type of premix is combined with liquid egg whites, agitated in accordance with the method of the invention, and baked; angel food cake may again be repeatedly successfully produced which, when compared with prior art angel food cakes, is of significantly improved quality.

To illustrate:

Example IV

A series of angel food cakes was produced from a premix comprising; 16.5% cake flour, 38.4% sugar, 3.70% of a chemical leavening composition consisting of sodium bicarbonate and sodium acid pyrophosphate; 0.40% gums and flavoring, and 0.30% salt. In preparing each cake, 41.7% fresh egg whites (based on the total quantity of premix and egg whites) were added to the premix and the combination was then agitated in a commercial bakery mixer until a homogeneous blend was obtained and a specific gravity of 0.7 was obtained. Agitation was then terminated and the "batter" was deposited in standard angel food cake pans and baked at 350° F. for 45 minutes. All of the cakes thus produced were completely successful, were of standard volume and height, and were of significantly improved qualtity relative to cakes produced in accordance with prior art compositions and methods.

Example V

Another series of angel food cakes was produced from a premix comprising 14.0% cake flour, 41.5% sugar, 4.0% of a leavening composition consisting of sodium bicarbonate and anhydrous monocalcium phosphate, 0.40% gums and flavoring and 0.30% salt. This premix was then combined with 42.0% fresh frozen egg whites (based on the total quantity of premix and egg whites) and blended in a commercial mixer until a specific gravity of 0.9 was obtained. The "batter" was then baked in standard angel food cake pans at 350° F. for 45 minutes. The resultant cakes were again of standard volume and height and were of significantly better quality than conventional angel food cakes.

Further examples include the same treatment as in Examples IV and V, but with the following admixtures:

Example VI

| | |
|---|---|
| Wheat flour | About 15%. |
| Sugar | About 40%. |
| Liquid egg whites | About 40%. |
| and a | |
| Chemical leavening composition | In the ratio of about 2 to 8%. | based on the total quantity of ingredients.

Example VII

| | |
|---|---|
| Wheat flour | About 14%. |
| Sugar | About 43%. |
| Liquid egg whites | About 43%. |
| and a | |
| Chemcial leavening composition | In the ratio of about 2 to 8%. | based on the total quantity of said admixture, said leavening composition consisting of sodium bicarbonate and at least one acidulant selected from the group consisting of: sodium acid pyrophosphate, sodium aluminum phosphate, anhydrous monocalcium phosphate, monocalcium phosphate monohydrate, adipic acid, fumaric acid, glucono delta lactone, citric acid, mono sodium phosphate tartaric acid and potassium acid tartrate.

Example VIII

| | |
|---|---|
| Wheat flour | About 1 part. |
| Sugar | About 3 parts. |
| Dehydrated egg whites | About ⅗ part. |
| and a | |
| Chemical leavening composition | In the ratio of about 2 to 8%. | based on the total quantity of ingredients after the reconstitution of the dehydrated egg whites.

Example IX

| | |
|---|---|
| Wheat flour | About 3 to 4 parts. |
| Sugar | About 10 parts. |
| Dehydrated egg whites | About 1 to 2 parts. |
| and a | |
| Chemical leavening composition | About 1 to 2 parts. | based on the total quantity of the ingredients after the reconstitution of the dehydrated egg whites.

In carrying out the present invention, it is of course obvious that the effectiveness of the many commercially available leavening compositions will vary somewhat. Most of the presently conventional leavening compositions have been tried and it has been found, at least as to those which have been tried, that from about 2.0% to about 8.0% leavening, basis the total quantity of ingredients, is satisfactory. Leavening selection will, of course, be greatly dependent upon operating conditions. Thus, an operator whose production cycle involves a relatively long floor time will choose a leavening having a relatively slow initial reaction rate. Other conditions may suggest one with a relatively rapid initial reaction rate. However, in any circumstance, selection of the leavening and the quantity thereof to be employed is easily arrived at by reference to the manufacturer's specifications which will, of course, nearly always include a rate of reaction curve.

The leavenings that are available are, of course, numerous. Typically, they consist of sodium bicarbonate in combination with one or more of the following acidulants: Sodium acid pyrophosphate, sodium aluminum phosphate, anhydrous monocalcium phosphate, monocalcium phosphate monohydrate, adipic acid, fumaric acid, glucono delta lactone, citric acid, mono sodium phosphate tartaric acid and potassium acid tartrate.

The quantities and proportions of flour, sugar and egg whites contemplated by this invention are those established as operable for angel food cakes, which though now standard for such cakes, vary radically from the amounts and proportions required to produce any other type of cake.

In accordance with the method of the present invention, which calls for the termination of agitation prior to developing an observable foaming of the egg whites, "observable foaming" though not precisely measurable, may be determined in at least two ways. The first and perhaps most precise manner of determining this point is by measurement of the specific gravity of the "batter." By the time the "batter" reaches a specific gravity of 1.0 or less, it is preferable to terminate agitation, even though at this point there still remains a considerable safety factor. The other method is visual, and hence subject to considerable variation in judgment. However, it has been found preferable to terminate blending, or agitation, as soon as all of the dry ingredients have been wetted and thoroughly dispersed within the fluid phase, even though there is a considerable margin of safety in this determination too. Moreover, it is to be noted that some incipient foaming of the egg white ingredient though not desirable, will not necessarily result in failure or poor quality.

From the foregoing it will be seen that the present invention provides the food art with a significant advance. With this invention the commercial producer in particular can operate with few, if any, failures and both the commercial and the individual producer can provide an angle food cake of significantly improved quality.

Further, it is significant to note that the composition and method of the present invention offers the retail purchaser the convenience and economy of unitary packaging, for with the elimination of the formerly required step of whipping the egg whites into a foam, the egg white ingredient may now be conveniently packaged along with the other ingredients.. Thus, fewer packages are required to merchandise the product and fewer utensils are required to prepare it, all of which means higher quality and more convenience at less cost.

Moreover, perhaps the most significant advance provided by the invention lies in what it provides to the commercial or institutional user who, unlike the individual consumer, found neither convenience nor improvement in purchasing dried eggs rather than fresh eggs since either had to be separately whipped until, in the judgment of the operator an adequately stiff foam had been produced. This meant that product loss and quality variation resulting from the judgment errors of poorly skilled workers was a serious economic problem to the producer. However, with the present invention these major problems of the commercial producer are virtually totally solved; for it may be easily determined in advance just what mixing times and other operating procedures should be employed to obtain satisfactory and uniform results in any given plant.

Thus, in commercial operations it is now possible, for the first time, to convert substantially 100% of the materials utilized into quality product. By contrast, conventional prior art compositions and methods, normally resulted in product failures of at least 10–15%.

What is claimed is:

1. A culinary product for use in the preparation of angel food cakes, said product comprising;
   an admixture comprising about fifteen percent wheat flour, about forty percent sugar and about forty percent liquid egg whites;
   and, about two to eight percent of a chemical leavening composition, based on the total quantity of said admixture and said leavening.

2. A culinary product for use in the preparation of angel food cakes, said product comprising;
   an admixture comprising about fourteen percent wheat flour, about forty-three percent sugar and about forty-three percent liquid egg whites;
   and, about two to eight percent of a chemical leavening composition, based on the total quantity of said admixture, said leavening composition consisting of sodium bicarbonate and at least one acidulant selected from the group consisting of;
   sodium acid pyrophosphate, sodium aluminum phosphate, anhydrous monocalcium phosphate, monocalcium phosphate monohydrate, adipic acid, fumaric acid, glucono delta lactone, citric acid, mono sodium phosphate tartaric acid and potassium acid tartrate.

3. The method of making an angle food cake, said method comprising the steps of;
   admixing wheat flour, sugar and liquid egg whites in proportions of about fifteen percent flour, forty percent sugar and forty percent liquid egg whites;
   combining said admixture with about two to eight percent of a chemical leavening composition based upon the total of said admixture and leavening;
   agitating said combination to effect blending thereof;
   terminating said agitation prior to development of an observable foaming of said egge whites;
   and baking said agitated combination.

4. The method of making an angel food cake, said method comprising the steps of;
   admixing the following ingredient parts by weight;
   about three to four parts cake flour, about ten parts sugar, about one to two parts of a chemical leavening composition, about one to two parts dehydrated egg whites;
   agitating said admixture with about ten parts by weight of water to form a batter thereof;
   terminating said agitation prior to development of an observable foaming of said egg whites;
   and baking said batter.

5. An angel food cake premix consisting of;
   an admixture comprising about 22% cake flour, about 62% to 64% sugar, about 9% dehydrated egg white;
   and about 5% to 7% of a chemical leavening composition.

6. The product of claim 5 wherein said chemical leavening composition comprises sodium bicarbonate and cream of tartar.

7. The product of claim 5 wherein said chemical leavening composition comprises sodium bicarbonate, cream of tartar, glucono-delta-lactone and citric acid.

8. The product of claim 5 wherein said chemical leavening composition comprises sodium bicarbonate and citric acid.

9. The product of claim 5 wherein said chemical leavening composition comprises sodium bicarbonate, sodium acid pyrophosphate and anhydrous monocalcium phosphate.

10. The product of claim 5 wherein said chemical leavening composition comprises sodium bicarbonate, fumaric acid and citric acid.

11. The product of claim 5 wherein said chemical leavening composition comprises sodium bicarbonate, and glucono-delta-lactone.

12. A culinary product for use in the preparation of angel food cakes, said product comprising;
    an admixture comprising about three to four parts flour and about ten parts cake sugar;
    and, about one to two parts of a chemical leavening composition.

13. A culinary product for use in the preparation of angel food cakes, said product comprising:
    an admixture comprising about one part wheat flour, about three parts sugar and about three parts liquid egg whites;
    and, about two to eight percent of a chemical leavening composition, based on the total quantity of said admixture and said leavening composition.

14. A culinary product for use in the preparation of angel food cakes, said product comprising;
    an admixture comprising about one part wheat flour and three parts sugar;
    and, about two to eight percent of a chemical leavening composition based on the total quantity of ingredients of the culinary product immediately prior to the baking thereof, said leavening composition consisting of sodium bicarbonate and at least one acidulant selected from the group consisting of:
    sodium acid pyrophosphate, sodium aluminum phosphate, anhydrous monocalcium phosphate, monocalcium phosphate monohydrate, adipic acid, fumaric acid, glucono delta lactone, citric acid, mono sodium phosphate tartaric acid and potassium acid tartrate.

15. A culinary product for use in the preparation of angel food cakes, said product comprising;
    an admixture comprising about one part wheat flour, about three parts sugar and about three-fifths part dehydrated egg whites;
    and, about two to eight percent of a chemical leavening composition based on the total quantity of ingredients after the reconstitution of the hydrated egg whites.

16. The method of making an angel food cake, said method comprising the steps of:
    admixing about one part wheat flour and about three parts sugar;
    combining said admixture with about three parts liquid egg whites and about two to eight percent of a chemical leavening composition, based on the total amount of said admixture, egg whites and leavening;
    agitating said combination to effect blending thereof;
    terminating said agitation prior to development of an observable foaming of said egg whites;
    and baking said agitated combination.

(References on following page)

References Cited in the file of this patent

UNITED STATES PATENTS

| | | |
|---|---|---|
| 2,776,893 | Finucane | Jan. 8, 1957 |
| 2,781,268 | Abbott et al. | Feb. 12, 1957 |
| 2,835,588 | Alexander et al. | May 20, 1958 |
| 2,930,698 | Barch et al. | Mar. 29, 1960 |

FOREIGN PATENTS

| | | |
|---|---|---|
| 670,415 | Great Britain | Apr. 16, 1952 |

OTHER REFERENCES

"Experimental Cookery," 2nd Ed., 1937 by Lowe, John Wiley & Sons, Inc. (New York), pp. 361, 450, 451.

"Everybody's Cook Book," 1924 by Lord, Henry Holt & Co., p. 132 (New York).